United States Patent
Niinami et al.

(10) Patent No.: US 11,914,039 B2
(45) Date of Patent: Feb. 27, 2024

(54) RANGE FINDING DEVICE AND RANGE FINDING METHOD

(71) Applicants: Norikatsu Niinami, Kanagawa (JP); Hirokazu Takenaka, Kanagawa (JP)

(72) Inventors: Norikatsu Niinami, Kanagawa (JP); Hirokazu Takenaka, Kanagawa (JP)

(73) Assignee: RICOH COMPANY, LTD., Tokyo (JP)

(\*) Notice: Subject to any disclaimer, the term of this patent is extended or adjusted under 35 U.S.C. 154(b) by 388 days.

(21) Appl. No.: 16/819,206

(22) Filed: Mar. 16, 2020

(65) Prior Publication Data

US 2020/0301011 A1    Sep. 24, 2020

(30) Foreign Application Priority Data

Mar. 20, 2019 (JP) .................................. 2019-053171
Sep. 5, 2019 (JP) .................................. 2019-162233

(51) Int. Cl.
*G01S 17/32* (2020.01)
*G01S 17/86* (2020.01)
(Continued)

(52) U.S. Cl.
CPC ............ *G01S 17/32* (2013.01); *G01S 7/4808* (2013.01); *G01S 7/4915* (2013.01); *G01S 7/4916* (2013.01); *G01S 17/86* (2020.01)

(58) Field of Classification Search
CPC ........ G01S 17/32; G01S 17/86; G01S 7/4808; G01S 7/4915; G01S 7/4916
See application file for complete search history.

(56) References Cited

U.S. PATENT DOCUMENTS 8,761,594 B1    6/2014  Gross et al.
9,325,920 B2 *  4/2016  Van Nieuwenhove ......................
                                                              G01S 7/4865
(Continued)

FOREIGN PATENT DOCUMENTS

JP    2010-219810    9/2010
JP    2011-233963    11/2011
(Continued)

OTHER PUBLICATIONS

Extended European Search Report dated Sep. 4, 2020 in European Patent Application No. 20162213.1, 9 pages.

*Primary Examiner* — Elias Desta
(74) *Attorney, Agent, or Firm* — XSENSUS LLP

(57) ABSTRACT

A range finding device includes a light-emitting unit including light-emitting regions; an optical element to guide light emitted from the light-emitting unit; a light-receiving unit including light receiving regions to receive light reflected from an object; and circuitry to control light emission amount of the light-emitting regions; measure an amount of light received at the light receiving regions; measure a distance to the object by measuring a time difference between a start time when the light is emitted from the light-emitting unit and a time when the light reflected from the object is received by the light receiving regions; cause the light-emitting regions to emit the same light amount as a preliminary light emission stage; control the light emission amount of the light-emitting regions for a main light emission stage based on the amount of light measured at the preliminary light emission stage; and measure the distance to the object.

20 Claims, 8 Drawing Sheets

(51) Int. Cl.
   *G01S 7/48*     (2006.01)
   *G01S 7/4915*   (2020.01)
   *G01S 7/4912*   (2020.01)

(56) References Cited

U.S. PATENT DOCUMENTS

| | | | |
|---|---|---|---|
| 9,921,312 B2* | 3/2018 | Takano | G01S 7/484 |
| 10,641,874 B2* | 5/2020 | Campbell | G01S 17/10 |
| 2011/0102619 A1 | 5/2011 | Niinami | |
| 2011/0261225 A1 | 10/2011 | Niinami | |
| 2012/0038903 A1 | 2/2012 | Weimer et al. | |
| 2013/0050408 A1 | 2/2013 | Masuda et al. | |
| 2013/0242040 A1 | 9/2013 | Masuda et al. | |
| 2014/0071226 A1 | 3/2014 | Satoh et al. | |
| 2015/0062363 A1 | 3/2015 | Takenaka et al. | |
| 2015/0222816 A1 | 8/2015 | Shohara et al. | |
| 2016/0048973 A1 | 2/2016 | Takenaka | |
| 2016/0147045 A1 | 5/2016 | Masuda et al. | |
| 2016/0227104 A1 | 8/2016 | Guan et al. | |
| 2018/0128919 A1 | 5/2018 | Ichikawa et al. | |
| 2018/0143322 A1 | 5/2018 | Rosenzweig et al. | |
| 2018/0284241 A1 | 10/2018 | Campbell et al. | |
| 2019/0394447 A1 | 12/2019 | Yokota et al. | |
| 2020/0029025 A1 | 1/2020 | Yokota et al. | |

FOREIGN PATENT DOCUMENTS

| | | |
|---|---|---|
| JP | 2012-198337 | 10/2012 |
| JP | 2013-054236 | 3/2013 |
| JP | 2013-066086 | 4/2013 |
| JP | 2013-066163 | 4/2013 |
| JP | 2013-182218 | 9/2013 |
| JP | 2013-192088 | 9/2013 |
| JP | 2013-198062 | 9/2013 |
| JP | 2013-198070 | 9/2013 |
| JP | 2013-214947 | 10/2013 |
| JP | 2013-218278 | 10/2013 |
| JP | 2014-056048 | 3/2014 |
| JP | 2014-057156 | 3/2014 |
| JP | 2014-123797 | 7/2014 |
| JP | 2016-027744 | 2/2016 |
| JP | 2016-040670 | 3/2016 |
| JP | 2016-058840 | 4/2016 |
| JP | 2016-114953 | 6/2016 |
| JP | 2016-140030 | 8/2016 |
| JP | 2017-022742 | 1/2017 |
| JP | 2017-058684 | 3/2017 |
| JP | 2017-111457 | 6/2017 |
| JP | 2017-175616 | 9/2017 |
| JP | 2018-074479 | 5/2018 |
| JP | 2018-077143 | 5/2018 |
| JP | 2018-152632 | 9/2018 |
| JP | 2018-155664 | 10/2018 |
| JP | 2018-163363 | 10/2018 |
| JP | 2019-074758 | 5/2019 |
| JP | 2019-097178 | 6/2019 |
| JP | 2019-118090 | 7/2019 |
| JP | 2019-159284 | 9/2019 |
| JP | 2019-159344 | 9/2019 |

\* cited by examiner

FIG. 5A
OUTPUT DISTRIBUTION OF TOF SENSOR
IN EACH REGION
(PRELIMINARY LIGHT EMISSION STAGE)
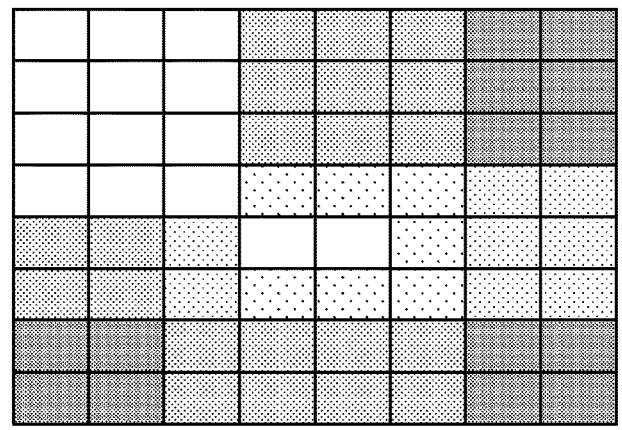
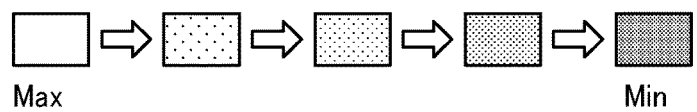
Max　　　　　　　　　　　　　　Min
(Near)　　　　　　　　　　　　　(Far)
　　　　OUTPUT OF TOF SENSOR
FIG. 5B
LIGHT EMISSION AMOUNT DISTRIBUTION
OF VCSEL FOR EACH REGION
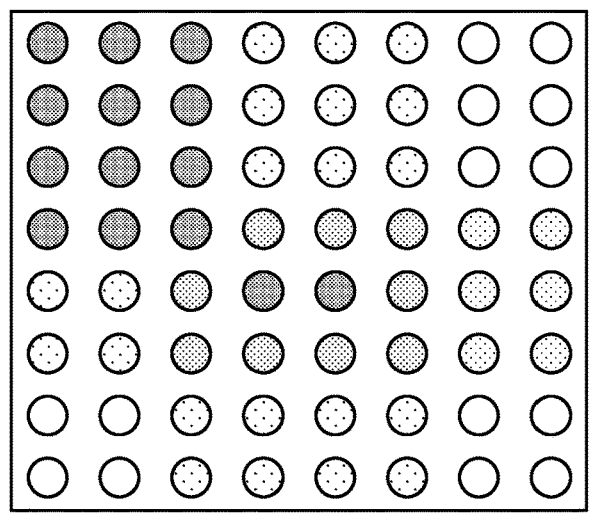
Min　　　　　　　　　　　　　　　Max
LIGHT EMISSION AMOUNT OF VCSEL

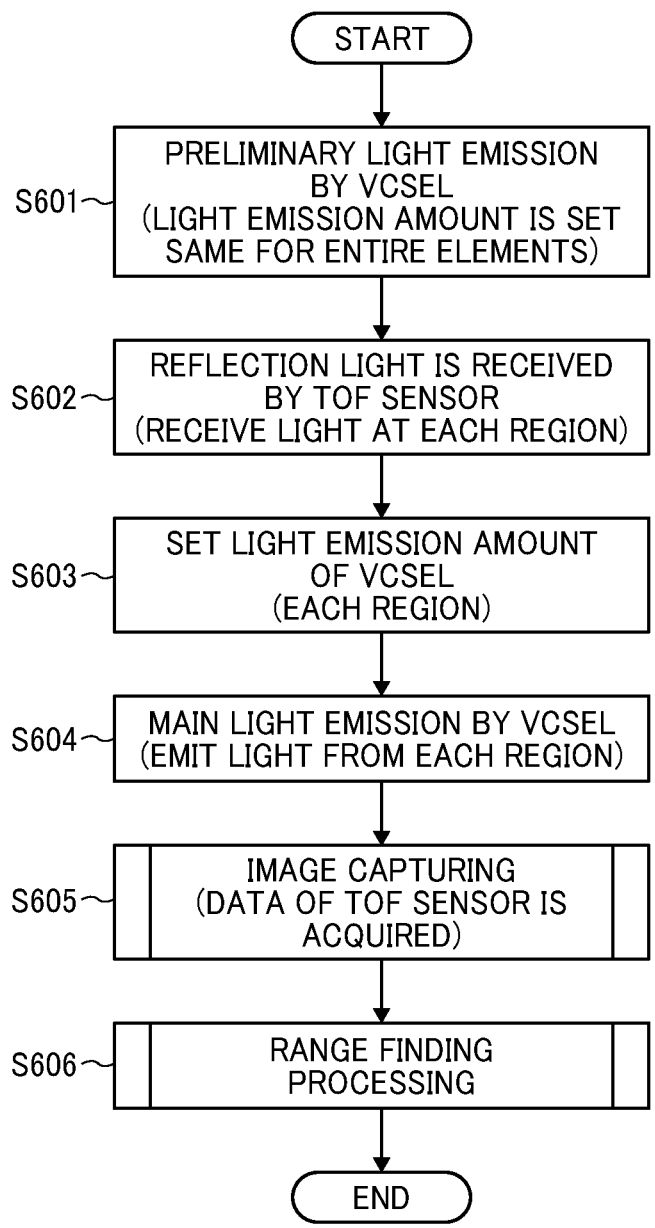

RANGE FINDING DEVICE AND RANGE FINDING METHOD

CROSS-REFERENCE TO RELATED APPLICATION

This application claims priority pursuant to 35 U.S.C. § 119(a) to Japanese Patent Application Nos. 2019-053171, filed on Mar. 20, 2019, and 2019-162233, filed on Sep. 5, 2019 in the Japan Patent Office, the disclosure of which is incorporated by reference herein in its entirety.

BACKGROUND

Technical Field

This disclosure relates to a range finding device and a range finding method.

Background Art

A range to an object existing in a range finding area can be detected or found using a method of emitting a laser beam toward the range finding area, receiving a reflection light reflected from the object existing in the range finding area, and calculating a distance to the object using a time difference between a start time when the laser beam is emitted and a time when the light reflected from the object is received. The range finding method is known as the time-of-flight (TOF) method or system. A range finding device that measures the range or distance to objects using the TOF system is referred to as a TOF camera or range finding camera. Further, the range finding device can be also referred to as an image capture apparatus or TOF camera.

In the range finding device (TOF camera) using the TOF method, the light-receiving level (the amount of received light) of the reflection light coming from the object is a critical factor. If the light receiving level is too low, the sensor output signal is not distinguishable from the noise signal, and if the light reception level is too high, the sensor output signal becomes saturated, with which the range or distance to object cannot be computed accurately.

One technology includes a light-receiving unit having a light receiving surface, and a lighting unit that emits the light, in which the intensity of light emitted from the lighting unit is controlled so that the light receiving surface receives the light amount of normal level to obtain an accurate range finding value.

This image capture apparatus (TOF camera) performs the exposure control based on the measured light amount of the target range finding area. That is, when the light-receiving unit measures the exposed light amount, if the measured light amount is equal to or greater than a given value (e.g., normal value), the intensity of light emitted from the lighting unit is reduced, and if the measured light amount is lower than the given value, the intensity of light emitted from the lighting unit is increased. However, this image capture apparatus (TOF camera) may not cope with a situation that the light intensity of the reflection light fluctuates or varies depending on a distance from the image capture apparatus (TOF camera) to a target object when the light is emitted from the lighting unit and then the light reflected from the object reaches the image capture apparatus (TOF camera).

SUMMARY

In one aspect of the present invention, a range finding device is devised. The range finding device includes a light-emitting unit including a plurality of light-emitting regions arranged in a two-dimensional array, configured to emit light from each of the plurality of light-emitting regions; an optical element configured to guide the light emitted from the light-emitting unit to a range finding area; a light-receiving unit configured to receive light reflected from a target object existing in the range finding area when the light emitted from the light-emitting unit hits the target object and reflects from the target object, the light-receiving unit being divided into a plurality of light receiving regions; and circuitry configured to control light emission amount of each of the plurality of light-emitting regions of the light-emitting unit respectively corresponding to the plurality of light receiving regions of the light-receiving unit; measure an amount of light received at each of the light receiving regions of the light-receiving unit; measure a distance to the target object for each of the light receiving regions of the light-receiving unit by measuring a time difference between a start time when the light is emitted from the light-emitting unit and a time when the light reflected from the target object is received by each of the light receiving regions of the light-receiving unit; cause each of the plurality of light-emitting regions of the light-emitting unit to emit the light with the same light amount as a preliminary light emission stage; control the light emission amount of each of the plurality of light-emitting regions of the light-emitting unit to be used for a main light emission stage corresponding to a range finding operation of the target object based on the amount of light received at each of the light receiving regions of the light-receiving unit that was measured at the preliminary light emission stage; and measure the distance to the target object for each of the light receiving regions of the light-receiving unit by performing the range finding operation at the main light emission stage.

In another aspect of the present invention, a method of finding a range to a target object is devised. The method includes emitting light from a light-emitting unit including a plurality of light-emitting regions arranged in a two-dimensional array; guiding the light emitted from the light-emitting unit to a range finding area using an optical element; receiving, using a light-receiving unit, light reflected from the target object existing in the range finding area when the light emitted from the light-emitting unit hits the target object and reflects from the target object, the light-receiving unit being divided into a plurality of light receiving regions; controlling light emission amount of each of the plurality of light-emitting regions of the light-emitting unit respectively corresponding to the plurality of light receiving regions of the light-receiving unit; measuring an amount of light received at each of the light receiving regions of the light-receiving unit; measuring a distance to the target object for each of the light receiving regions of the light-receiving unit by measuring a time difference between a start time when the light is emitted from the light-emitting unit and a time when the light reflected from the target object is received by each of the light receiving regions of the light-receiving unit; causing each of the plurality of light-emitting regions of the light-emitting unit to emit the light with the same light amount as a preliminary light emission stage; controlling the light emission amount of each of the plurality of light-emitting regions of the light-emitting unit to be used for a main light emission stage corresponding to a range finding operation of the target object based on the amount of light received at each of the light receiving regions of the light-receiving unit that was measured at the preliminary light emission stage; and measuring the distance to the target object for each of the light receiving regions of the light-receiving unit by performing the range finding operation at the main light emission stage.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 5A illustrates an example of output distribution at imaging regions of TOF sensor at a preliminary light emission stage when a laser light source emits a preliminary light;

FIG. 5B illustrates an example of light emission amount of a laser light source at a main light emission stage when a laser light source emits a main light corresponding to the output distribution at imaging regions of TOF sensor when the laser light source emits the preliminary light;

FIG. 6 illustrates an example of flowchart of a normal or standard image capturing operation according to the embodiment;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions.

It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of a range finding apparatus and a range finding method according to an embodiment with reference to the drawings.

First Embodiment

Figure 1:
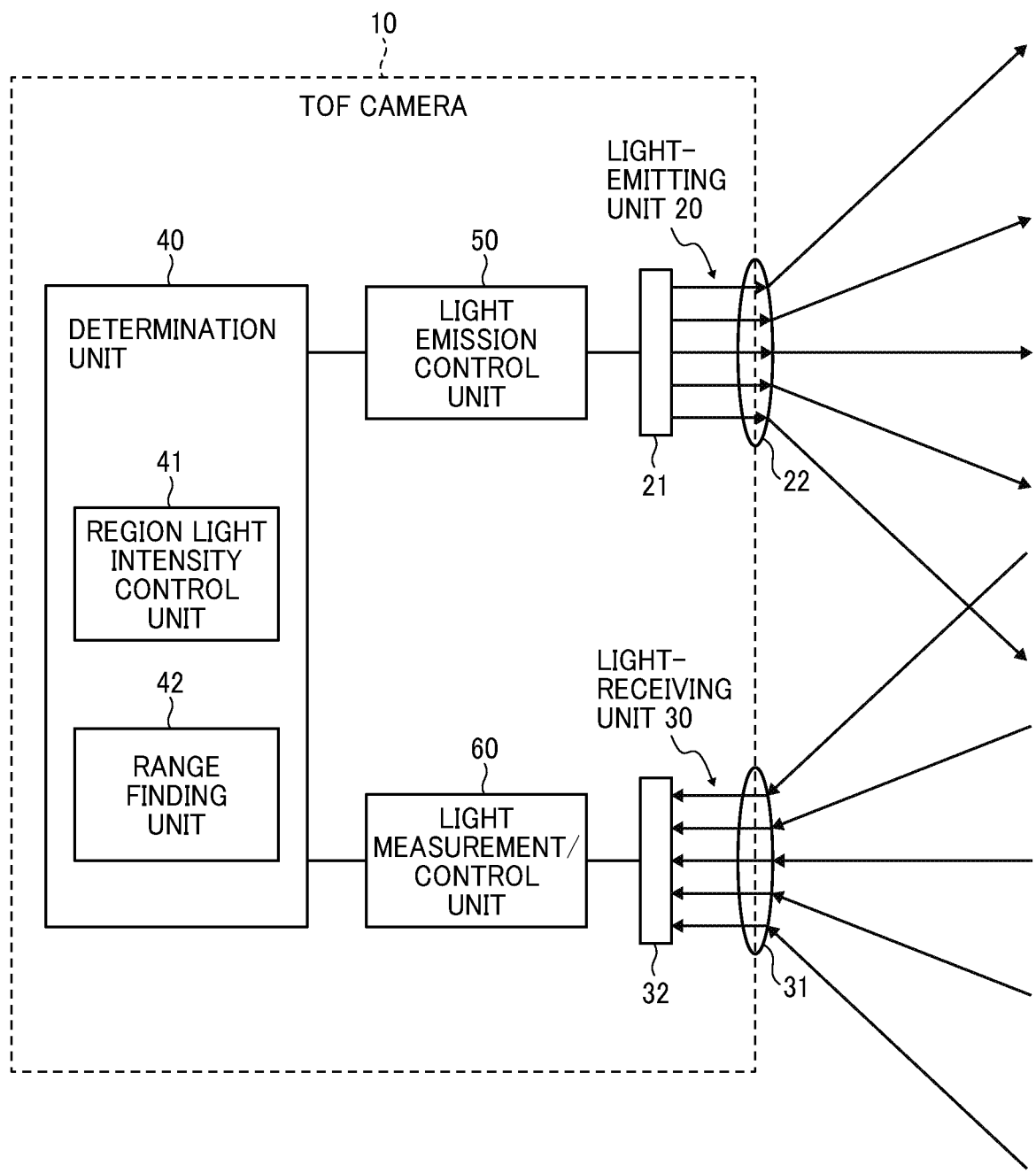
FIG. 1 schematically illustrates a configuration of an optical system and a control system of a range finding device used for performing a range finding method according to an embodiment.

FIG. 1 illustrates an example of a schematic configuration of a TOF camera 10 described as an example of range finding device according to first embodiment. As illustrated in FIG. 1, the TOF camera 10 includes, for example, a light-emitting unit 20 and a light-receiving unit 30. The TOF camera 10 further includes, for example, a vertical cavity surface emitting laser (VCSEL) 21, a lens 22, a light emission control unit 50, a determination unit 40, a light measurement/control unit 60, a light receiving lens 31, and a light receiving sensor 32 (TOF sensor 32). As illustrated in FIG. 1, in the TOF camera 10, the light-emitting unit 20 emits laser light of a rectangular wave or sine wave having a modulated frequency of some megahertz (MHz) to an object as projection light, and after the light-emitting unit 20 emits the laser light as the projection light to the object, the projection light hits and reflects from the object, and then the light-receiving unit 30 receives the light reflected from the object.

The light-emitting unit 20 includes, for example, a vertical cavity surface emitting laser (VCSEL) 21 as a light source. The VCSEL 21 includes a plurality of light-emitting regions arrayed two-dimensionally. The light emission control unit 50 controls the light emission operation of each one of the light-emitting regions of the VCSEL 21. The light-emitting unit 20 further includes the lens 22 (an example of optical element) that adjusts (e.g., enlarge) an angle of view of the light emitted from each of light-emitting points or regions of the VCSEL 21 to a given required angle and then projects the projection light with the given angle of view.

The TOF camera 10 includes the determination unit 40. The determination unit 40 controls the light emission control unit 50 to control the emission timing and the emission amount of light emitted by the light-emitting regions of the VCSEL 21.

The light-receiving unit 30 includes, for example, the light receiving lens 31 and the light receiving sensor 32. The light receiving lens 31 collects the light reflected from the object, and the light receiving sensor 32 receives the light collected by the light receiving lens 31 and performs the photoelectric conversion of the light. In the embodiment, the light receiving sensor 32 employs, for example, a time-of-flight (TOF) sensor. The light receiving sensor 32 is configured by arranging light receiving regions (e.g., sensor elements) in a two-dimensional pattern corresponding to the two-dimensional pattern of the light-emitting regions of the VCSEL 21, and the detection signal of each sensor element is output individually. The sensor element is also referred to as the imaging element.

In this description, the TOF camera 10 includes the light-emitting unit having a plurality of light-emitting regions arranged in the two-dimensional array (e.g., laser light source unit), and the imaging element, in which an imaging face of the imaging element is divided into a plurality of discrete imaging regions (i.e., mesh pattern) by setting the number of discrete imaging regions same as the number of light-emitting regions and setting the same arrangement pattern for the light-emitting regions and the discrete imaging regions, and then the range of object is detected for each imaging region. In this description, the imaging region may be also referred to as light receiving region.

The detection signal of the light receiving sensor 32 is input to the light measurement/control unit 60. The light measurement/control unit 60 performs statistical data processing of the sensor output value received from each detection region of the light receiving sensor 32 such as the TOF sensor, and functions as a region light intensity measurement unit that measures the light receiving level (the amount or quantity of received light) for each imaging region. The light measurement/control unit 60 also controls the light reception time, light reception sensitivity, timing or the like of the light receiving sensor 32, which are synchronized with the light emission control of the light-emitting regions of the VCSEL 21.

The region light intensity measurement unit also measures the light receiving level (light receiving amount) for each imaging region during a preliminary light emission stage of the laser light by the VCSEL 21, and then a region light intensity control unit 41, to be described later, controls the light emission amount at the time of performing the range finding of object (hereinafter, main light emission stage) based on the amount of light received by each of imaging regions during the preliminary light emission stage.

The determination unit 40 includes, for example, the region light intensity control unit 41. The region light intensity control unit 41 determines the light emission amount of each light emission region of the VCSEL 21 and the light reception sensitivity of the light receiving sensor 32 during the image capturing operation based on the statistical sensor output data of each light receiving region of the light receiving sensor 32. The determination unit 40 further includes, for example, a range finding unit 42. The range finding unit 42 measures or calculates a distance to a target object for each imaging region by measuring the time difference between a time when emitting the laser beam from the VCSEL 21 and a time when receiving the light reflected from the object by the light receiving sensor 32 for each imaging region.

The range finding operation by the TOF camera 10 is equivalent to the known TOF camera operation using the general phase detection method. For example, the technology of the TOF camera described in JP-2018-077143-A can be used. Therefore, the detailed description of the range finding operation by the TOF camera 10 is omitted.

Figure 2:
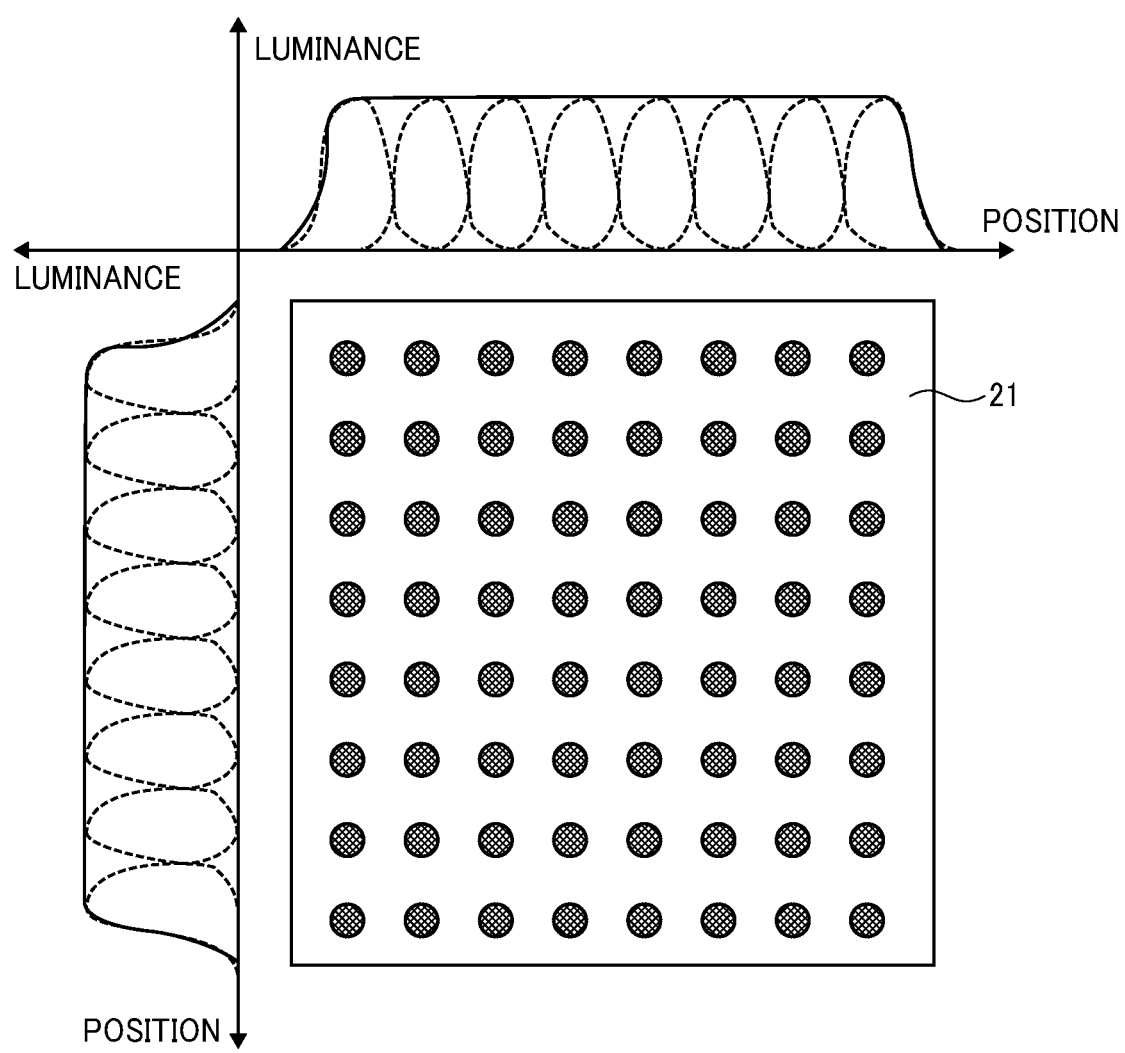
FIG. 2 schematically illustrates an example of a light-emitting surface of a laser light source arranging a plurality of light-emitting regions in a two-dimensional array, and a luminance distribution profile in a lateral direction and a luminance distribution profile in a longitudinal direction.

Hereinafter, a description is given of a two-dimensional arrangement of the sensor elements of the VCSEL 21 used as the light source unit of the light-emitting unit 20 with reference to FIG. 2. FIG. 2 schematically illustrates a light-emitting surface of the VCSEL 21, in which each circle (shaded circle) indicates each light-emitting region, and eight light-emitting regions are arranged in a longitudinal direction and a lateral direction, respectively, and thereby a total of 64 light-emitting regions are arranged two-dimensionally. Further, each light-emitting region includes a plurality of VCSEL elements arranged with an equal interval.

FIG. 2 also illustrates a luminance distribution profile in a lateral direction along the upper edge of the VCSEL elements, and a luminance distribution profile in a longitudinal direction along the left edge of the VCSEL elements. As to the luminance distribution profile, the dotted line indicates the luminance distribution profile of each VCSEL element, and the solid line indicates the luminance distribution profile when the entire VCSEL elements simultaneously emit the light. As indicated by the luminance distribution profile indicated by the solid line, when the entire elements simultaneously emit the light, the light emission become a substantially uniform surface emission. In other words, the arrangement interval of the elements are determined so as to achieve the uniform surface emission. The arrangement interval of the elements varies depending on specifications of the VCSEL element. For example, the arrangement interval of the elements is set to approximately 50 μm in scale.

Figure 3:
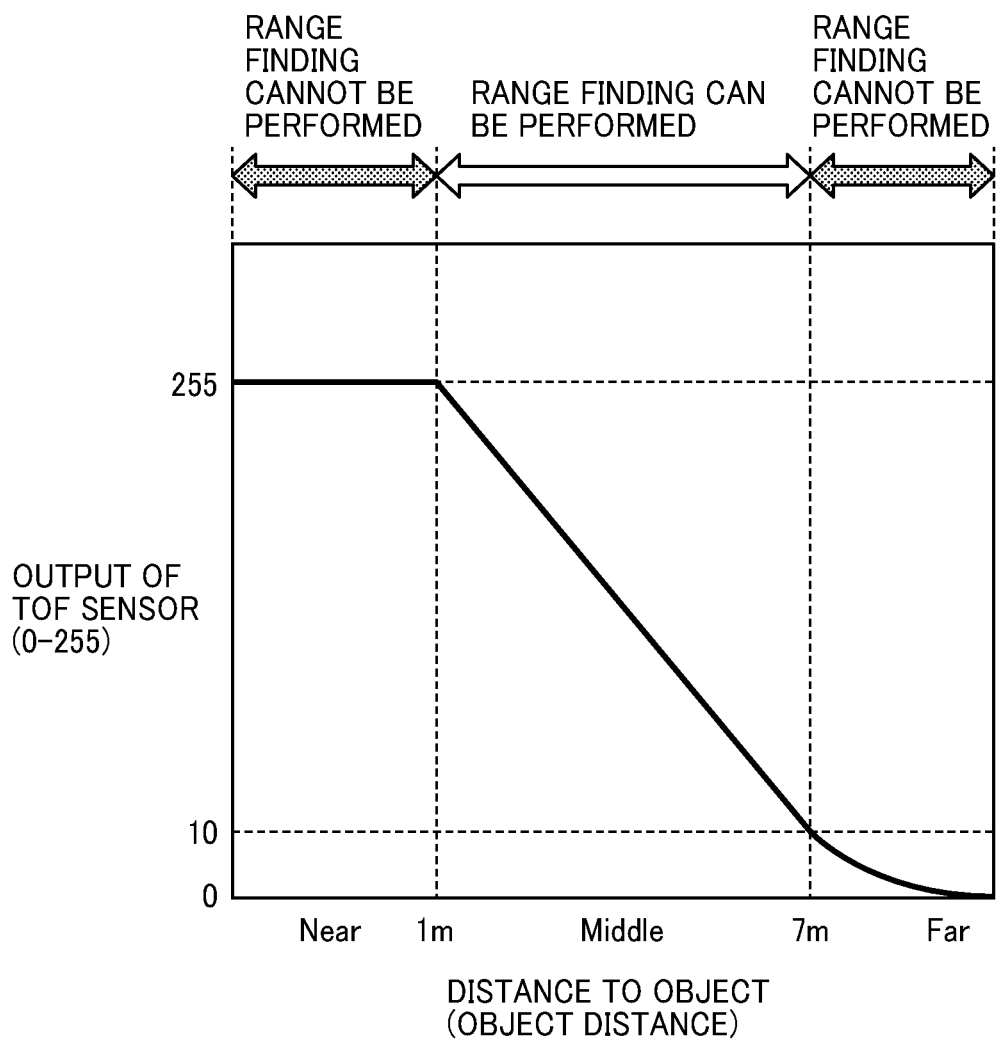
FIG. 3 illustrates a diagram illustrating a range to object detectable and a range to object not detectable when light emission amount of a laser light source is set to one given value.

FIG. 3 illustrates a relationship between an output of the light receiving sensor 32 and a range or distance to object (hereinafter, object distance) when the entire regions of the VCSEL 21 emit the light having the same intensity, and then the light receiving sensor 32 receives the light reflected from the object and outputs the detection signal. In FIG. 3, the horizontal axis represents the distance to object (object distance), and the vertical axis represents the output of the light receiving sensor 32 within an output range of levels "0 to 255." The object exists within a field of view of the light receiving sensor 32.

When a lateral direction of the light receiving surface of the light receiving sensor 32 is defined as X direction, a longitudinal direction of the light receiving surface of the light receiving sensor 32 is defined as Y direction, and a direction away from the light receiving surface of the light receiving sensor 32 is defined as Z direction, the light receiving surface becomes a X-Y plane. When a range finding area is viewed from the light receiving sensor 32, the distance to the object from the discrete imaging regions on the X-Y plane of the light receiving sensor 32 may vary for each of the discrete imaging regions except that the object existing in the range finding area is a plane object parallel to the XY plane.

When the light set with a given uniform intensity is emitted from the TOF system toward the range finding area, the level of the reflection light becomes higher in an area where a nearby object is present, and the output level of the light receiving sensor 32 is saturated.

Further, the level of the reflection light becomes lower in an area where a far-side object is present, and the output signal of the light receiving sensor 32 is not distinguishable from the noise signal. That is, when the object distance position is too close to or too far from the TOF camera 10, the range finding cannot be performed or the range finding precision deteriorates, and thereby the range of object detectable by performing the range finding operation is restricted.

Hereinafter, a description is given of this situation in detail with reference to FIG. 3. When the VCSEL 21 emits the light with the same light amount with respect to each of the pixels arranged in the array, as illustrated in FIG. 3, the light reflected by the far-side object is attenuated, and the output of the light receiving sensor 32 becomes smaller. In an example case of FIG. 3, the relationship between the sensor output and the object distance becomes non-linear when the object distance exceeds 7 m, and the range finding accuracy deteriorates, so that the output of the light receiving sensor 32 becomes invalid. Since the attenuation of the reflection light is small for the nearby object, the output of the light receiving sensor 32 becomes larger.

Figure 8:
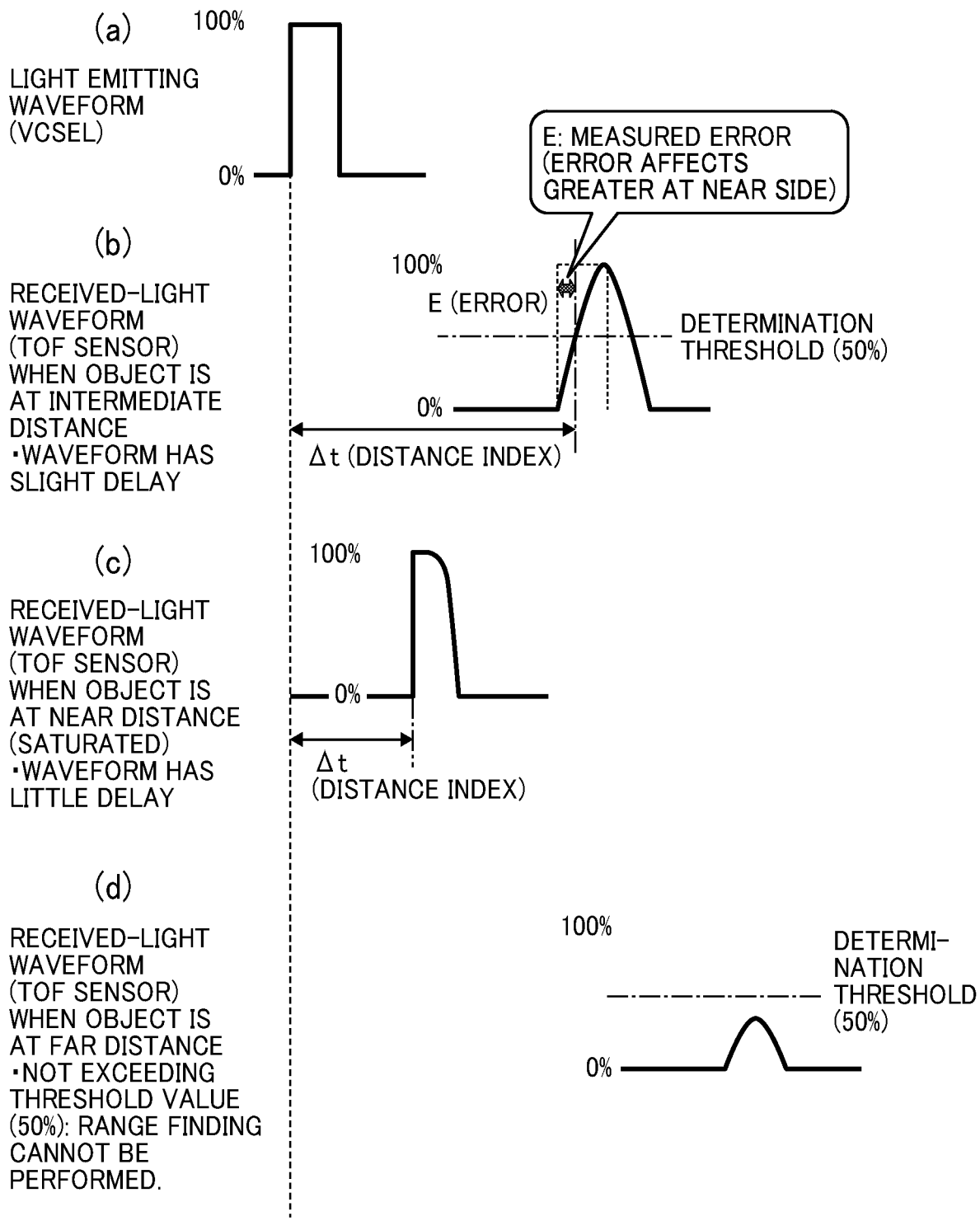
FIG. 8 (8(a), 8(b), 8(c), 8(d)) illustrates examples of timing charts used for describing a reason why a range finding accuracy deteriorates or range finding cannot be performed for a nearby object and a far-side object.

FIG. 8 illustrates examples of timing chart used for describing a reason why the range finding accuracy by the light receiving sensor 32 deteriorates or the range finding cannot be performed for a nearby object and a far-side object. FIG. 8(*a*) illustrates the light emission amount of the VCSEL 21 with respect to the timeline. The light emitting waveform is a rectangular waveform.

FIG. 8(*b*) illustrates an output waveform of the light receiving sensor 32 when an object is at a middle range or intermediate distance, such as 1 m to 7 m. The received-light waveform is not a rectangular waveform, but becomes a sinusoidal waveform having a slight delay. An output determination threshold value is set for the light receiving sensor 32 to determine a point to measure a phase difference Δt of the light emission timing and the light reception timing. A time period to become the threshold value level is measured, and then the phase difference Δt is converted into distance information. A precise range finding can be performed for the object at the intermediate distance.

FIG. 8(*c*) illustrates an output waveform of the light receiving sensor 32 when the object is at a near side or distance, such as within 1 m. When the object is at the near side, the output of the light receiving sensor 32 becomes larger and saturated, so that the rising of the waveform becomes steep. Therefore, a deviation error occurs in the time when the output of the light receiving sensor 32 becomes the determination threshold value (50% in this example case) compared to the ideal sinusoidal waveform of FIG. 8(*b*). This deviation error is indicated in FIG. 8(*b*) as "E." Since the deviation error "E" affects greater as the phase difference Δt becomes smaller (i.e., distance index becomes shorter as indicated in FIG. 8(*c*)), the range finding error becomes greater when the output of the light receiving sensor 32 is saturated for the nearby object. Therefore, when the output of the light receiving sensor 32 is saturated, the range finding operation is not performed correctly.

FIG. 8(*d*) illustrates an output of the light receiving sensor 32 when the object is at a far side or distance, such as 7 m or more. The amount of light received by the light receiving sensor 32 decreases as the object is at the far side. Therefore, the output of the light receiving sensor 32 does not exceed the determination threshold value required for the phase difference measurement, and the measurement of the phase difference Δt cannot be performed. In this case too, the range finding operation is not performed correctly.

As indicated in FIG. 8, the object distance that can be measured by emitting the light from the entire elements of the VCSEL 21 at the same time with the same light amount for one light emission operation is limited to a given range area.

Figure 4:
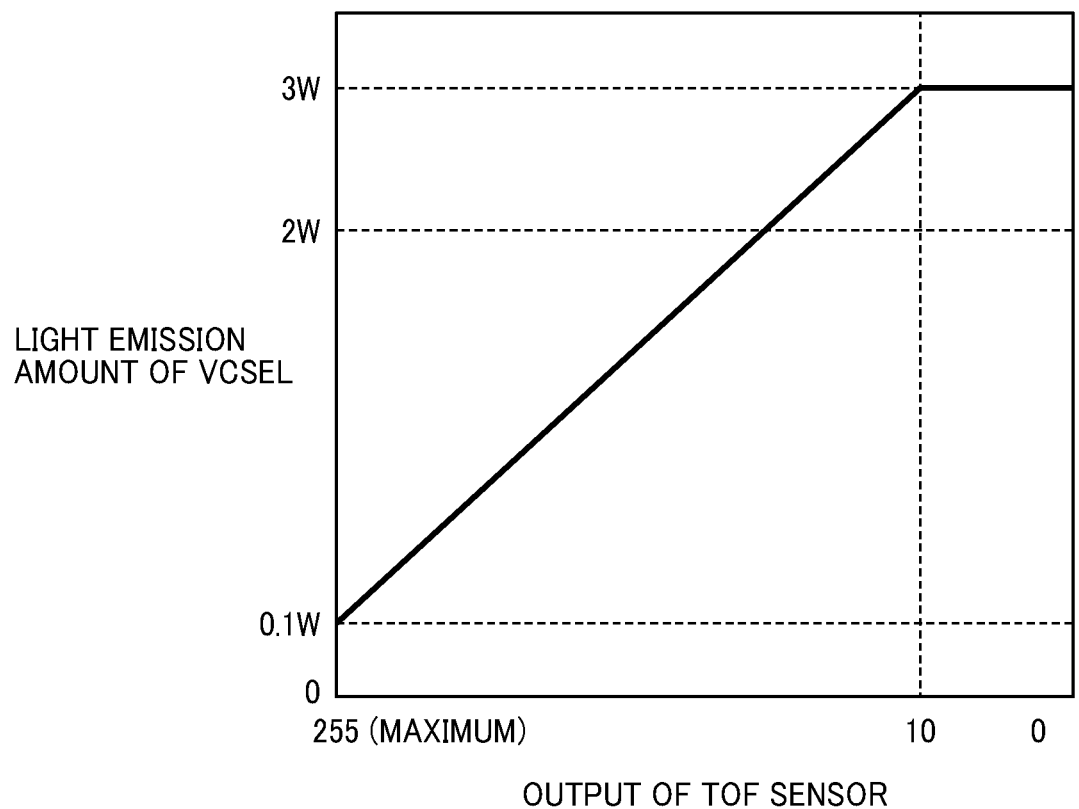
FIG. 4 is a graph illustrating an example of light emission control of a laser light source based on an output of TOF sensor.

FIG. 4 illustrates an example of the light emission control of the VCSEL 21 based on the output of the light receiving sensor 32. In FIG. 4, the horizontal axis represents the output of the light receiving sensor 32, and the maximum output level is 255 and the minimum output level is 0. The vertical axis represents the light emission amount of the VCSEL 21, in which the maximum light emission amount is 3 watt [W].

As illustrated in FIG. 4, the light-emission amount of the VCSEL 21 at the main light emission stage (second light emission stage) is controlled in accordance with the output of the light receiving sensor 32 when the same amount of light is emitted from the entire elements of the VCSEL 21 at the preliminary light emission stage (first light emission stage).

If the distance to object is far and the output of the light receiving sensor 32 becomes smaller at the preliminary light emission stage, and thereby the range finding operation cannot be performed, the light-emission amount of the VCSEL 21 at the main light emission stage is increased. By contrast, if the distance to the object is close and the output of the light receiving sensor 32 is saturated at the preliminary light emission stage, the light-emission amount of the VCSEL 21 at the main light emission stage is reduced. The region light intensity control unit 41 controls the light emission control unit 50 to control the light emission amount at the main light emission stage.

FIGS. 5A and 5B illustrate examples of the light emission control of the VCSEL 21 according to the light amount value measured at each light receiving region of the light receiving sensor 32. FIG. 5A illustrates an example of output distribution of the respective light-receiving regions of the light receiving sensor 32 at the preliminary light emission stage when the light receiving region of the light receiving sensor 32 is divided into 8×8 regions, in which the output distribution is drawn by changing patterns of the output distribution. Specifically, in accordance with the output of the light receiving sensor 32, a region where the output is larger is expressed with a thin density shaded pattern while a region where the output is small is expressed with a thick density shaded pattern. In other words, the region expressed by the thin density shaded pattern indicates that the distance to the object in this region is close, and the region expressed by the thick density shaded pattern indicates the distance to the object in this region is far.

In FIG. 5A, the region where the object is substantially at the infinity position is expressed by the thickest density shaded pattern, and the region where the object is present at the closest position, in other words, the region where the output of the light receiving sensor 32 becomes the maximum (the region where the output of the light receiving sensor 32 is saturated) is expressed by white without using the density shaded pattern. In FIG. 5A, to simplify the description, five density shaded patterns including white are used, but is not limited thereto. The actual output of the light receiving sensor 32 can be categorized into a plurality of patterns.

FIG. 5B illustrates an example of light emission amount of each region set for the VCSEL 21 when the output distribution of the light receiving sensor 32 at the preliminary light emission stage becomes the output distribution illustrated in FIG. 5A, in which the light emission amount is drawn by changing patterns of the light emission amount. The thinner the density pattern, the greater the light emission amount. In accordance with the output distribution of FIG. 5A, the region where the object is estimated to be at the near side, the light emission amount of the VCSEL 21 is controlled to be smaller, while the region where the object is estimated to be at the far side, the light emission amount of the VCSEL 21 is controlled to be greater. As similar to FIG. 5A, in FIG. 5B, to simplify the description, five density patterns including white are used, but is not limited thereto. The actual light emission amount of the VCSEL 21 can be categorized into a plurality of patterns.

FIG. 6 illustrates an example of flowchart of a normal or standard image capturing operation by setting a given standard sensitivity to the light receiving sensor 32.

In step S601, the preliminary light emitting is performed prior to an image capturing operation. In step S601, the light emission amount of the VCSEL 21 is set to the same for the entire pixels so that the light emission amount is set to a uniform level for the entire regions of the VCSEL 21.

In step S602, the reflection light is received and detected by the light receiving sensor 32 at the preliminary light emission stage. Since the light receiving sensor 32 includes the light receiving regions, each of which is the discrete light-receiving region as described above, a statistical value of each light receiving region is calculated from the sensor output value of the respective light receiving regions.

In step S603, the light emission amount at each region of the VCSEL 21 to be used for the main light emission stage (image capturing operation) is set based on the statistical value of each of the light receiving regions calculated in step S602. The light emission amount of the VCSEL 21 is set as described with reference to FIGS. 5A and 5B.

In step S604, the main light emission stage is performed by emitting the light from the VCSEL 21 with the light amount set in step S603.

In step S605, the data of the light receiving sensor 32 is acquired in line with the light emission timing.

In step S606, the range finding processing is performed based on the data of the light receiving sensor 32 obtained in step S605 to calculate distance information of the object existing within the angle of view set by the lens 22 (optical element). As described above, by setting the appropriate light emission amount for each of the light-emitting regions of the VCSEL 21, the range of object detectable by performing the range finding operation can be improved.

Second Embodiment

Figure 7:
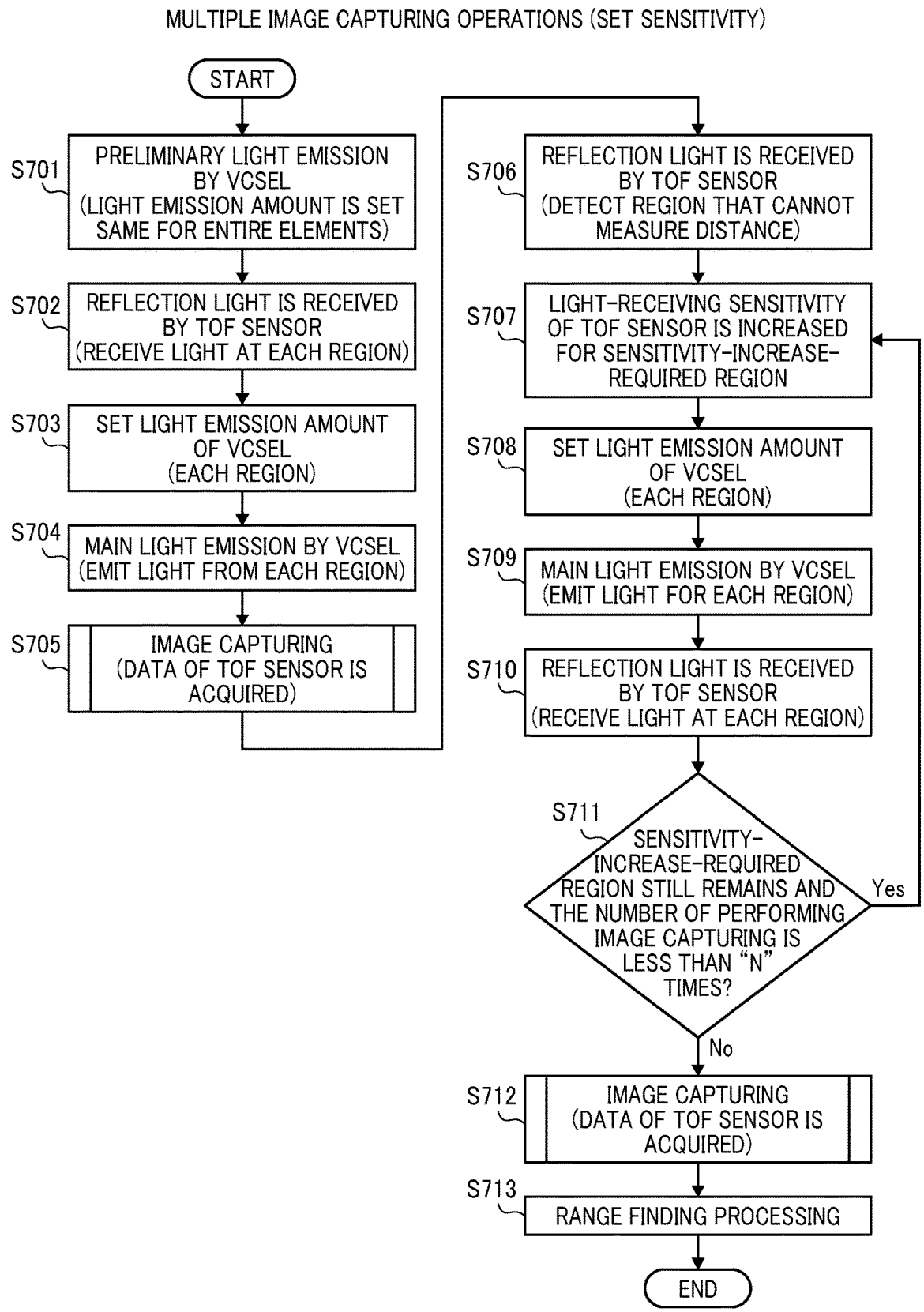
FIG. 7 illustrates an example of flowchart of an image capturing operation when the image capturing operation is performed for multiple times according to the embodiment.

FIG. 7 illustrates an example of flowchart of an image capturing operation with a higher sensitivity when the sensitivity of the light receiving sensor 32 is reset. Steps S701 to S705 in FIG. 7 are the same as steps S601 to S605 in the flowchart of FIG. 6, and steps S701 to S705 are performed until acquiring the captured image data.

When the light is emitted at the main light emission stage, in step S706, the reflection light is detected by the light receiving sensor 32, a statistical value of each light receiving region of the light receiving sensor 32 is calculated from the sensor output value of the respective light receiving regions of the light receiving sensor 32, and then a region where the range finding cannot be performed due to too-small sensor output is detected as a sensitivity-increase-required region.

In step S707, the light-receiving sensitivity of the light receiving sensor 32 is increased at the sensitivity-increase-required region alone, detected in step S706.

In step S708, the light-emission amount is set for each light-emitting region of the VCSEL 21.

In step S709, the light is emitted from each light-emitting region of the VCSEL 21 based on the light-emission amount set in step S708.

In step S710, the light is received at each light-receiving region of the light receiving sensor 32.

In step S711, it is confirmed whether or not the sensitivity-increase-required region still exists. If the sensitivity-increase-required region still exists (S711: YES), the sequence returns to step S707, and then the sensitivity of the sensitivity-increase-required region is increased and then the range finding operation is performed again and the light is received by the light receiving sensor 32 again. If the sensitivity-increase-required region does not exist (S711: NO), the sequence proceeds to step S712.

In step S712, the image capturing operation is performed, and then the data detected by the light receiving sensor 32 is stored.

In the sequence described in FIG. 7, if the sensitivity-increase-required region still exists (S711: YES), the sequence from step S707 is repeated and the image capturing operation is performed in step S712 while setting an upper limit for the number of times of performing the image capturing operation to "N" times.

In step S713, the range finding processing is performed based on the data of the light receiving sensor 32 obtained in step S712 to calculate the range or distance information of the object existing within the angle of view set by the lens 22 (optical element).

As described above, by setting the appropriate light emission amount for each light-emitting region of the VCSEL 21, and the appropriate sensitivity for each light-receiving regions of the light receiving sensor 32, the range of object detectable by performing the range finding operation can be further increased compared to the range finding operation of FIG. 6.

According to the above described embodiment, a range of object detectable by performing the range finding operation can be improved for far-side objects and nearby objects.

In the above-described embodiments, the VCSEL having the plurality of light-emitting regions arranged in the two-dimensional array is described as the laser light source unit having the plurality of light-emitting regions arranged in the two-dimensional array, but is not limited thereto. For example, any light source unit having a plurality of light-emitting regions arranged in a two-dimensional array can be used instead of the VCSEL.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. A range finding device comprising:
    a light-emitter including a plurality of light-emitting regions arranged in a two-dimensional array to emit light from each of the plurality of light-emitting regions;
    a light-receiver to receive light reflected from a target object existing in a ranue finding area when the light emitted from the light-emitter hits the target object and reflects from the target object, the light-receiver being divided into a plurality of light receiving regions; and
    circuitry configured to
    control light emission amount of each of the plurality of light-emitting regions of the light-emitter;
    measure an amount of light received at each of the light receiving regions of the light-receiver to obtain a measured output;
    measure a distance to the target object for each of the light receiving regions of the light-receiver by based on the measured output;
    cause the light-emitter to emit the light as a preliminary light emission stage;

control the light emission amount of each of the plurality of light-emitting regions of the light-emitter to be used for a main light emission stage corresponding to a range finding operation of the target object based on the amount of light reflected from the target object existing in the range finding area when the light emitted from the light-emitter hits the target object and reflects from the target object at the preliminary light emission stage; and measure the distance to the target object for each of the light receiving regions of the light-receiver by performing the range finding operation at the main light emission stage.

2. The range finding device according to claim 1, wherein the circuitry configured to control light-receiving sensitivity of each of the light-receiving regions of the light-receiver, and wherein when the amount of light received at one or more particular light receiving regions of the light-receiver, measured by the region light intensity measurement structure at the preliminary light emission stage, is lower than a given threshold value, the circuitry increases the light-receiving sensitivity of the one or more particular light receiving regions of the light-receiver, and the circuitry measures the distance to the target object using the light receiving regions of the light-receiver after increasing the light-receiving sensitivity of the one or more particular light receiving regions of the light-receiver.

3. The range finding device according to claim 1,
wherein the circuitry configured to control light-receiving sensitivity of each of the light-receiving regions of the light-receiver, wherein when the amount of light received at the one or more particular light receiving regions of the light-receiver, measured by the circuitry during the preliminary light emission stage, is saturated, the circuitry decreases the light-receiving sensitivity of the one or more particular light receiving regions of the light-receiver, and the circuitry measures the distance to the target object using the light receiving regions of the light-receiver after decreasing the light-receiving sensitivity of the one or more particular light receiving regions of the light-receiver.

4. The range finding device according to claim 1,
wherein the light-emitter includes vertical cavity surface emitting laser as a light source.

5. The range finding device according to claim 1,
wherein the optical structure is a wide-angle lens.

6. The range finding device according to claim 1, further comprising an optical structure configured to guide the light emitted from the light-emitter to the range finding area.

7. The range finding device according to claim 1,
wherein the circuitry is configured to:
measure amounts of light received at the plurality of light receiving regions respectively corresponding to the plurality of light-emitting regions of the light-emitter; and measure a distance to the target object for each of the light receiving regions of light receiver.

8. The range finding device according to claim 7,
wherein the circuitry is configured to measure a time difference between a start time when the light is emitted from the light-emitter and a time when the light reflected from the target object is received by each of the light receiving regions of the light-receiver.

9. The range finding device according to claim 1,
wherein the circuitry is further configured to cause each of the plurality of light-emitting regions of the light-emitter to emit the light with the same light amount as the preliminary light emission stage.

10. The range finding device according to claim 1,
wherein based on the amount of light received at each of the light receiving regions of the light-receiver that was measured at the preliminary light emission stage, the circuitry controls the light emission amount of each of the plurality of light-emitting regions of the light-emitter to be used for the main light emission stage to be smaller as the amount of light received at a corresponding region of the plurality of light-emitting regions of the light-emitter is greater.

11. The range finding device according to claim 1,
wherein based on the amount of light received at each of the light receiving regions of the light-receiver that was measured at the preliminary light emission stage, the circuitry controls the light emission amount of each of the plurality of light-emitting regions of the light-emitter to be used for the main light emission stage to be greater as the amount of light received at a corresponding region of the plurality of light-emitting regions is smaller.

12. The range finding device according to claim 1,
wherein the circuitry
calculates a statistical value of each of the light receiving regions of the light-receiver that was measured at the preliminary light emission stage; and
controls the light emission amount of each of the plurality of light-emitting regions of the light-emitter to be used for the main light emission stage based on the statistical value calculated.

13. The range finding device according to claim 1,
wherein the light emitted from the light-emitter at the preliminary light emission stage has a uniform luminance distribution in the range finding area.

14. The range finding device according to claim 1,
wherein the light-receiver includes an imaging element, and
the plurality of light receiving regions is an imaging face of the imaging element, and
the plurality of light receiving region is arranged respectively corresponding to the plurality of light-emitting regions and having equal numbers of the plurality of light-emitting regions.

15. A method of finding a range to a target object, comprising:
emitting light from a light-emitter including a plurality of light-emitting regions arranged in a two-dimensional array;
guiding the light emitted from the light-emitter to a range finding area using an optical structure;
receiving, using a light-receiver, light reflected from the target object existing in the range finding area when the light emitted from the light-emitter hits the target object and reflects from the target object, the light-receiver being divided into a plurality of light receiving regions;
controlling light emission amount of each of the plurality of light-emitting regions of the light-emitter;
measuring an amount of light received at each of the light receiving regions of the light- receiver to obtain a measured output;
measuring a distance to the taruet object based on the measured output;

causing each of the plurality of light-emitting regions of the light-emitter to emit the light with the same light amount as a preliminary light emission stage;

controlling the light emission amount of each of the plurality of light-emitting regions of the light-emitter to be used for a main light emission stage corresponding to a range finding operation of the target object based on the amount of light received at each of the light receiving regions of the light-receiver that was measured at the preliminary light emission stage; and measuring the distance to the target object for each of the light receiving regions of the light-receiver by performing the range finding operation at the main light emission stage.

16. The method according to claim 15, further comprising:

controlling a light-receiving sensitivity of each of the light-receiving regions of the light- receiver:

increasing the light-receiving sensitivity of one or more particular light receiving regions when the amount of light received at the one or more particular receiving regions, measured by a region light intensity measurement structure at the preliminary light emission stage, is lower than a given threshold value; and measuring the distance to the target object using the light receiving regions of the light- receiver after increasing the light-receiving sensitivity of the one or more particular light receiving regions of the light-receiver.

17. The method according to claim 15, further comprising:

controlling a light-receiving sensitivity of each of the light-receiving regions of the light- receiver:

decreasing the light-receiving sensitivity of one or more particular light receiving regions of the light-receiver when the amount of light received at the one or more particular light receiving regions of the light-receiver, measured at the preliminary light emission stage, is saturated; and measuring the distance to the target object using the light receiving regions of the light- receiver after decreasing the light-receiving sensitivity of the one or more particular light receiving regions of the light-receiver.

18. A light projecting-receiving device comprising:

a projection system including a plurality of light-emitting regions configured to emit light to an area;

a light-receiving system including a plurality of light receiving regions configured to receive light reflected from a target object in the area and output a detection signal; and circuitry configured to:

cause the projection system to emit first light;

receive a first detection signal output from the light-receiving system that has received light including the first light reflected from the target object, determine light emission amount of each of the plurality of light-emitting regions based on the first detection signal;

cause the projection system to emit second light based on the light emission amount;

receive a second detection signal output from the light-receiving system that has received light including the second light reflected from the taruet object; and output the second detection signal to a unit that measures a distance between the light receiving regions and the target object based on the second detection signal.

19. The light projecting-receiving device according to claim 18, wherein the circuitry is configured to control light-receiving sensitivity of each of the light-receiving regions of the light-receiving system based on the first detection signal.

20. The light projecting-receiving device according to claim 18, wherein the projection system includes:

a light source including the plurality of light-emitting regions; and optical structure configured to guide light emitted from the projection system to the area.

* * * * *